April 19, 1927.
E. W. PERRY
RESILIENT TIRE
Filed Nov. 6, 1925
1,625,742
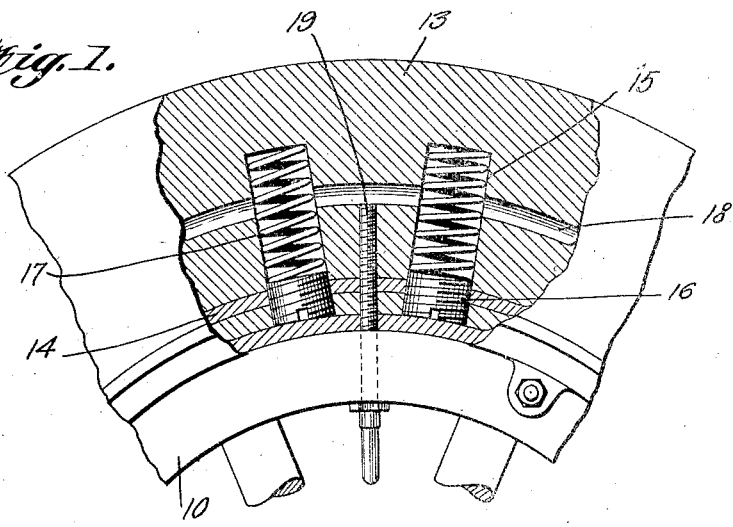
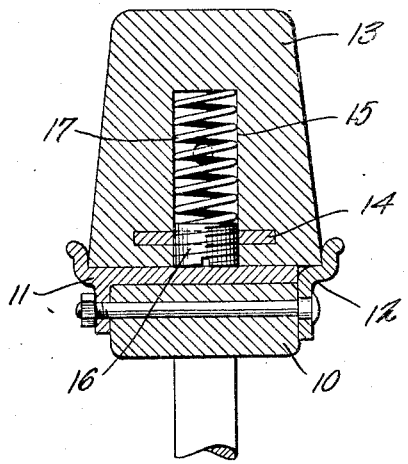
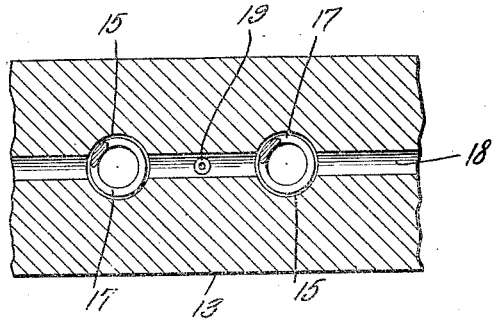

Patented Apr. 19, 1927.

1,625,742

UNITED STATES PATENT OFFICE.

EDGAR W. PERRY, OF BOSTON, MASSACHUSETTS.

RESILIENT TIRE.

Application filed November 6, 1925. Serial No. 67,363.

This invention relates to improvements in resilient tires obviating the use of inner tubes and eliminating the possibility of punctures in providing cushion tire having pockets which house adjustably secured springs relevant to the weight and desired resiliency of the tire and a duct for the carrying of air therewithin in order that resiliency will be created equal to the resiliency of ordinary pneumatic tires.

Another object of my invention resides in the provision of an annular plate arranged adjacent the inner periphery of the tire to facilitate the mounting of set screws therein for engagement with the inner ends of the springs, so positioned, for regulating a desired spring compression relevant to weight and desired resiliency of the tire.

With the above and other objects in view, the invention further includes the following novel features and details of construction, to be hereinafter more fully described, illustrated in the accompanying drawing and pointed out in the appended claims.

In the drawing:—

Figure 1 is a fragmentary side elevation of the tire with parts in section illustrating the spring mountings and air duct.

Figure 2 is a transverse section taken through the tire and wheel mounting therefor.

Figure 3 is a longitudinal sectional view taken through the air duct and spring pockets.

Referring to the drawing in detail, wherein like characters of reference denote corresponding parts, the reference character 10 indicates a wheel felly having a rim 11 positioned thereon with a removable flange section 12 secured to one side thereof in retaining a tire 13 thereupon, being similar in cross section to that of a solid tire and having molded or otherwise secured therein and adjacent to its inner periphery an annular plate 14 having registering tapped openings therein registering with radially disposed pockets 15 arranged within the tire 13 and having set screws or lugs 16 secured therein and engaging the inner convolutions of springs 17 so positioned within the pockets 15 in regulating the desired spring tension or compression of the springs. An air duct 18 extending annularly and centrally within the tire 13 being interconnected and associated with the spring pockets 15 whereby an air valve 19 extending through the felly 10, rim 11 and being associated with the air duct 18 may be filled with a desired quantity of air in providing both a spring resilient tire and pneumatic tire, but yet providing a resiliency attained during the use of inner tubes and at a much lower figure in maintenance.

The invention is susceptible of various changes in its form, proportions and minor details of construction, and the right is herein reserved to make such changes as properly fall within the scope of the appended claims.

Having thus described the invention, what is claimed is:—

1. A resilient tire of the character described having an annular plate arranged therein adjacent the inner periphery thereof, an air duct extending annularly of the tire and radially disposed interconnected pockets being arranged therein, compression springs mounted within the pockets, and set screws carried by the annular plate for regulating the tension of the springs.

2. A resilient tire of the character described having an annular plate arranged therein and adjacent the inner periphery thereof, an air duct extending annularly of the tire and radially disposed spring pockets being arranged therein and inter-connected by said duct, compression springs mounted within the spring pockets, and set screws carried by the annular plate for regulating the tension of the springs and an air-valve communicating with the air duct to facilitate the filling of the air duct and spring pockets with a quantity of air.

In testimony whereof I have affixed my signature.

EDGAR W. PERRY.